June 10, 1969    N. BURSTEIN    3,448,678
RADIANT-HEAT CONVEYOR COOKER
Filed Aug. 7, 1967    Sheet 1 of 2

INVENTOR
NORMAN BURSTEIN
BY
ATTORNEY

June 10, 1969     N. BURSTEIN     3,448,678
RADIANT-HEAT CONVEYOR COOKER
Filed Aug. 7, 1967
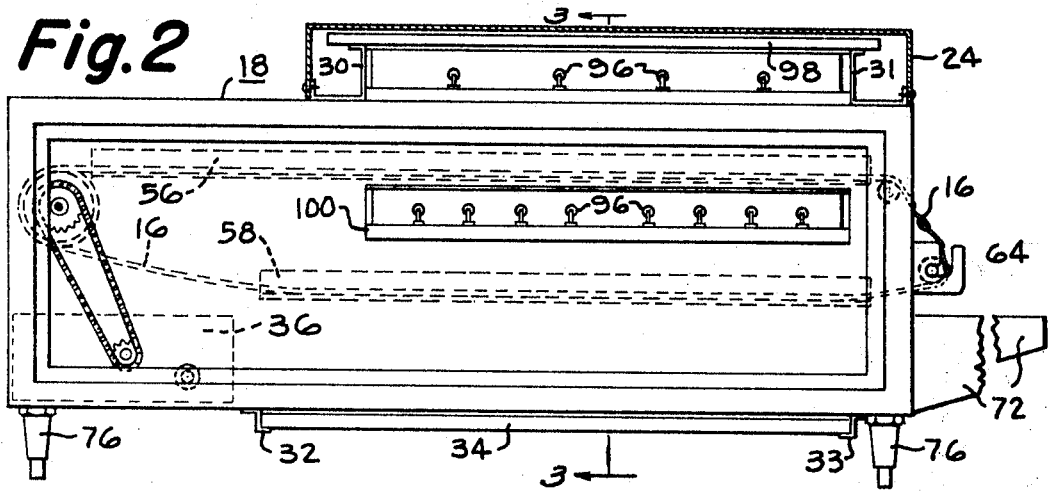
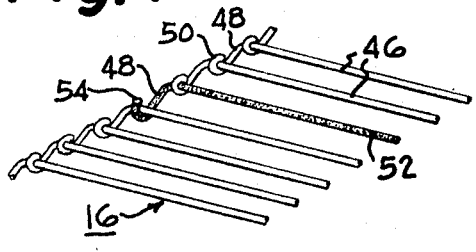
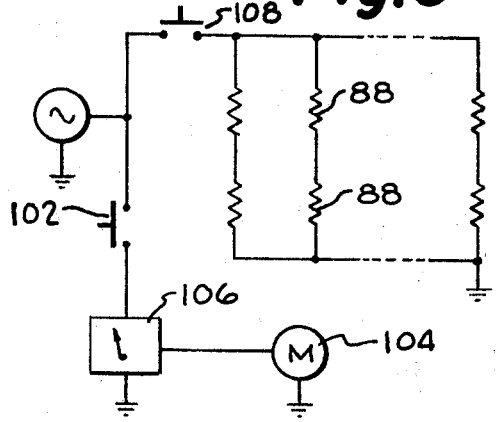
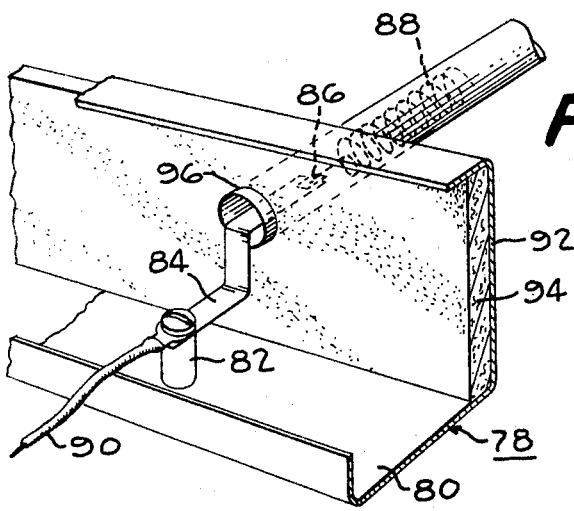
INVENTOR
NORMAN BURSTEIN
ATTORNEY

United States Patent Office 3,448,678
Patented June 10, 1969

3,448,678
RADIANT-HEAT CONVEYOR COOKER
Norman Burstein, Cherry Hill, N.J., assignor of one-third to Bernard Mennies, and one-third to Bernard Kanoff, Philadelphia, Pa.
Filed Aug. 7, 1967, Ser. No. 658,741
Int. Cl. F27b 9/06; F27d 11/02; A47j 37/04
U.S. Cl. 99—386
7 Claims

ABSTRACT OF THE DISCLOSURE

A radiant-heat cooker employs a housing with a tunnel enclosure portion through which an open-work conveyor passes and in which radiant heaters are mounted above and below the conveyor. The heaters supply ultraviolet and infrared radiation for complete cooking during a single passage. The conveyor is formed of linked bars with one bar having a removable open link.

---

This invention relates to food cooking equipment, and particularly to a radiant-heat conveyor cooker.

Radiant heaters and conveyor ovens have been used for cooking foods. For example, large scale baking ovens have been equipped with conveyors and with radiant heaters in addition to hot air systems. In modern-day restaurants there is a need for cooking equipment which is relatively compact in size for the relatively small kitchen sizes that are available, and which can be used for broiling such foods as hamburgers and for baking rolls. This equipment should preferably be compact in size so that it can fit in readily available space, such as a counter top. The cooking portion of the equipment should have sufficient capacity to cook ample quantities of food at any time and without a warm-up period. The cooking portion of the equipment should be able to complete the cooking process during a single passage of the food therethrough and at speeds sufficient to meet peak demands of the restaurant.

Accordingly, it is among the objects of this invention to provide a new and improved conveyor cooker.

Another object is to provide a new and improved conveyor cooker which is suitable for broiling and baking.

Another object is to provide a new and improved cooker employing radiant heating for rapid cooking of foods carried on a conveyor.

Another object is to provide a new and improved conveyor cooker which is compact in size, efficient in use, and adapted for relatively easy cleaning.

In one embodiment illustrative of this invention, a radiant-heat conveyor cooker employs a housing that includes a pair of side walls, a material loading portion, a radiant-heat cooking portion, and an unloading portion. An open-work, continuous conveyor belt extends between the housing walls from the loading portion thereof, through a tunnel enclosure forming the cooking portion, to the unloading portion. A motor and belt drive is located at the loading portion, which drives and supports the upper, material-supporting surface of the belt. The conveyor belt includes a plurality of spaced bars that extend across the path of the belt with their ends bent to form a closed link around the next adjacent bar. One of the bars of the belt is formed with open links for removably engaging the next adjacent bar to complete the continuous belt. At the unloading end of the housing, a belt support and bearing includes means for releasably applying tension to the belt to maintain the open-link bar in engagement, whereby the tension may be released, the bar unhooked, and the belt removed for cleaning. The tension applying means includes a bearing rod that projects from the unloading end of the housing so that the path of the conveyor belt extends outside of the housing. A tray support is provided beneath the outwardly extending conveyor belt to receive food as it drops therefrom.

In one embodiment, the radiant-heat system includes a plurality of heater units that are located in the tunnel enclosure above and below the upper material supporting surface of the belt. Each of the heating units includes a resistance wire for emitting radiation over a range of wavelengths, including long and short infrared and long ultraviolet. A sheath encloses the wire and transmits substantially all of that radiation. Thereby, food passing through the enclosure portion is cooked internally and browned externally by the radiation during a single passage through the tunnel enclosure. The number of heater units located below the material supporting surface of the belt is substantially greater than the number of those located above the belt. A reflector in the roof of the tunnel enclosure assists in returning radiation to the food on the belt.

The foregoing and other objects of this invention, the various features thereof, as well as the invention itself, may be more fully understood from the following description when read together with the accompanying drawing, in which:

FIG. 2 is a side view of the conveyor cooker of FIG. 1;

FIG. 4 is a perspective view of a fragment of the conveyor belt used in the cooker of FIG. 1;

FIG. 5 is a perspective view of a heater unit and mounting for the cooker of FIG. 1; and FIG. 6 is a schematic circuit diagram of the electrical control circuit.

Throughout the drawing, similar parts are referenced by corresponding numerals.

Figure 1:
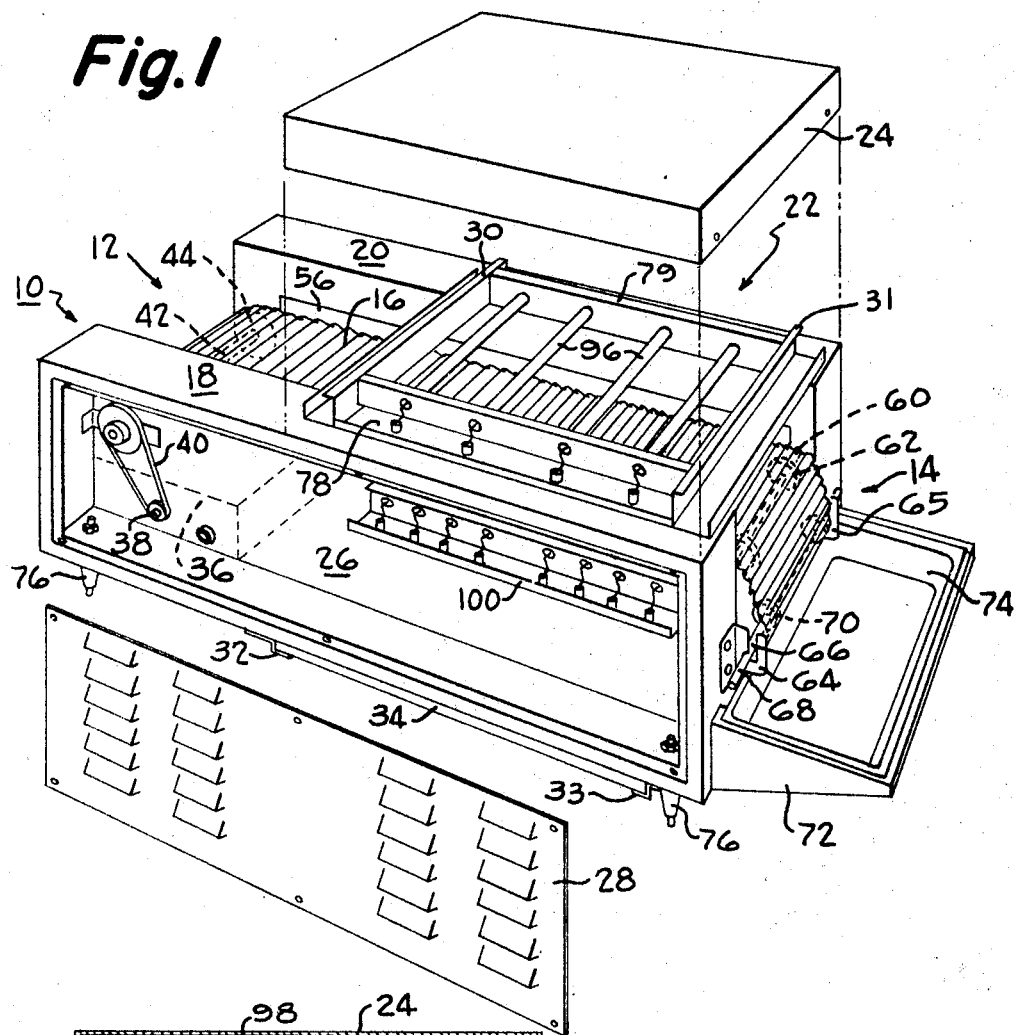
FIG. 1 is a perspective view, partly exploded, of the top, unloading end, and a side of a conveyor cooker embodying this invention.
Figure 3:
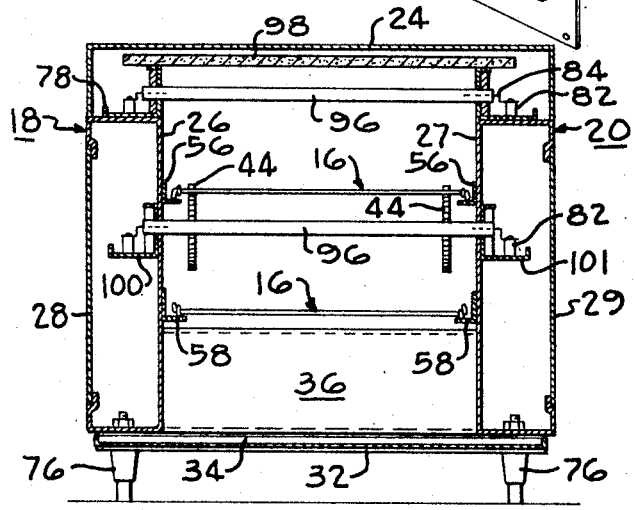
FIG. 3 is a sectional view along the line 3—3 of FIG. 2.

The conveyor cooker illustrated in the drawing includes a housing 10 having a loading end 12 and an unloading end 14 for a conveyor belt 16, which passes between a pair of housing walls 18 and 20 and through a tunnel enclosure 22 formed under a lid 24. The housing 10 is formed of sheet metal, such as aluminum or steel. The walls 18 and 20 are each formed of flat inner wall sections 26, with bent top, bottom and end sections to form a hollow wall to which a louvered outer-wall cover 28 is secured. The side walls 18 and 20 are secured in spaced relation by a pair of parallel structural members 30 and 31, which are attached to the tops of the walls 18 and 20. The lid 24 is formed with bent sides and fits over and is attached to the members 30 and 31. A pair of spaced angle brackets 32 and 33 are attached to the bottom sides of the walls 18 and 20, and have shoulders forming a track to slidably receive a shallow drip pan 34 which is removably positioned underneath the walls 18 and 20 and provides the floor of the tunnel enclosure portion 22. The drip pan 34 receives any food or drippings that fall from the conveyor belt during its passage through the tunnel enclosure 22.

A motor housing 36 is provided between the walls 18 and 20 at the loading end 12 of the housing 10. The motor shaft 38 is connected by a sprocket-and-chain drive mechanism 40 to a shaft 42 which drives the conveyor belt 16 via sprocket wheels 44. The conveyor belt 16 is formed of a plurality of steel bars 46, coated with Teflon or other suitable material which is adapted to be subjected to high temperatures in the cooking unit and may be readily cleaned. Each of the bars 46 extends at right angles to the path of the belt through the housing 10 and has its ends 48 bent to extend along that path. Each end 48 terminates in a closed link 50 which embraces the next adjacent bar 46. In this fashion a continuous open-work, flexible conveyor belt, in the nature of a grille, is formed. One of the bars 52 (darkened in the drawing for easy identification) has an open link 54 at each end 48. This open link permits ready engagement and disengagement of the belt within the conveyor, whereby the user may remove the belt for cleaning and thereafter reinsert and assemble it within the housing.

Two pairs of narrow angle brackets 56 and 58 extend along and are attached to the inside walls 26 of the housing and project inwardly to provide shoulder supports for the ends of the conveyor bars 46. The curved portions of the links 50 and 54 of the conveyor bars bear on the shoulders formed by the brackets 56 and 58. The upper brackets 56 are positioned to maintain the conveyor belt 16 substantially in a horizontal orientation from the drive sprockets 44 at the loading end to a belt support and bearing 60 at the unloading end. The latter is in the form of a rod mounted between the housing walls 18 and 20 at the unloading end and carries circular bearing surfaces 62 over which the belt slides. A fixed rod 60 and bearings 62 have been found suitable; however, rotatable idlers may be used in place thereof.

A pair of brackets 64 and 65 project outwardly from the end walls at the unloading end 14 of the housing. These brackets 64, 65 have grooves 66 for slidably receiving a rod 68. An undercut in the groove 66 retains the rod in position at the bottom of said groove during normal operation. The rod 68 carries circular bearing surfaces 70 over which the conveyor belt rides. The location of the rod 68 outside of the housing determines the path of the conveyor belt 16, which extends downwardly and outwardly from the bearing rod 60 at which it leaves the housing. The rod 70 maintains tension on the conveyor belt to insure engagement of the open links 50 of conveyor bar 52 during operation of the belt. To remove the belt, the rod 68 is removed through the slots in the brackets 64, 65, to slacken the belt and permit disengagement of the links 54. The belt is reassembled by engaging the links 54 and inserting the rod 68 under the belt and in the brackets 64, 65 in the manner illustrated. The lower brackets 58 support the lower side of the belt as it returns from the unloading end through the tunnel enclosure, from which it rises to the drive sprockets 44 at the loading end 12.

A tray supporting bracket 72 is secured to the unloading ends of the housing walls 18 and 20; the bracket is in the form of a U-shaped frame, which receives a removable tray 74 and which is attached beneath the brackets 64 and 65. Thereby, cooked food leaving the tunnel enclosure 22 drops from the conveyor belt 16 as it passes out of the housing and downwardly onto the tray 74. The housing 10 is supported on four short legs 76 that are bolted into the bottoms of the walls 18 and 20.

The heater units within the tunnel enclosure are mounted above and below the upper surface of the conveyor belt 16. Two heater mounting brackets 78 and 79 are attached respectively to the tops of the walls 18 and 20 and between the structural members 30 and 31. As illustrated in FIG. 5, each mounting bracket has a horizontal portion 80 through which a porcelain terminal post 82 is mounted. A metal electrical contactor 84 in the form of a flat metal strip bent in a Z-shape has one end screwed to the top of post 82, and the other end includes a bent spring portion 86 for receiving and holding the end of a coiled resistance wire 88. Asbestos covered lead wire 90 is connected to the shaped fixed end of the contactor 84 and is connected at its other end to the power supply control switch (not shown) which is located at the loading end 12 of the housing adjacent to the motor housing 36. The vertical portion 92 of the mounting bracket 78 has a bent-over top portion to enclose a strip of asbestos insulation 94. A circular hole in the asbestos 94 and vertical bracket section 92 passes a tubular sheath 96, which is preferably fabricated of silica glass. The inner end of the contractor 84 and the resistance wire 88 are enclosed by the sheath 96. This construction, it has been found, permits quick removal and replacement of a faulty heater element 88. That is, the contactors 84 are unscrewed from their terminal posts 82 and the entire unit, including the sheath 96, may be slid out and replaced.

As illustrated in FIGS. 1 and 2, the brackets 78 and 79 are constructed with holes and posts to support four such heater tubes 96. The tubes are arranged in parallel fashion extending transversely across the path of the conveyor belt. A rectangular aluminum reflector pan 98 is mounted on top of the members 30, 31, 78, 79; this pan 98 has a polished under surface for reflecting radiation downward onto the belt 16. The lid 24 encloses the entire upper heating section, as shown in FIG. 2. A second pair of mounting brackets 100 and 101 are attached to the outer surface of wall sections 26 and 27, respectively. These brackets 100 and 101 are formed in the same fashion as bracket 78, illustrated in FIG. 5, and the heating tubes 96 are mounted in those brackets and through wall sections 26, 27 in the manner described above. The lower heater tubes are mounted relatively close to the conveyor belt to obtain more effective utilization of the radiation.

The heating element 88 is formed of resistance wire such as Nichrome or kanthol, which is energized to operate with a surface temperature of about 1,800 degrees F. to 2,000 degrees F. The sheath 96 prevents air movement about the element 88 to maintain the desired temperature. The diameter of the heater wire 88 and the tightness of the turns are chosen to develop the proper resistance for the energizing voltage to produce the desired temperature. At these temperatures, the wire emits a radiation over a range of wavelengths from about 0.4 micron to about 400 microns. In the range of 0.4 to 0.7 micron, the radiation is a long ultraviolet; in the range of 0.7 to 100 microns, the radiation is short infrared; and in the range of 100 to 400 microns, long infrared. The sheath 96 is preferably formed of a 96 percent silica glass, a suitable form of which is available under the trade name Vycor. This material has the desirable characteristic of passing about 96 percent of all of the infrared and ultraviolet wavelengths. In addition, it has excellent high temperature characteristics and high electrical insulation. Four heating elements enclosed by the sheaths 96 are mounted in the brackets 78, 79 above the conveyor belt; these units 96 are substantially equally spaced within the tunnel enclosure 22 to supply radiation throughout the tunnel passage of food on the conveyor belt. The lower heater units 96, mounted in the brackets 100, 101, are twice in number and also substantially equi-spaced within the enclosure. The larger number of heaters below the conveyor belt have been found necessary to insure uniform cooking of the lower portion of the food carried by the belt. One reason for this appears to be the opaque material of the conveyor bars 46, which effectively block the transmission of radiation from below and limit it to the space between these bars. In addition, the reflector 98 insures greater efficiency of return of the radiation to the supper surface of the conveyor belt and the food carried thereon. Such a reflector has not been found to be practical for use below the conveyor belt, since it tarnishes due to food and drippings that fall during the cooking process.

The control circuit, illustrated schematically in FIG. 6, is energized by 60-cycle alternating current and includes a manual switch 102 for controlling the energization of the belt-drive motor 104 via a conventional speed controller 106, such as a variable rheostat and rectifier. A separate manual switch 108 independently controls the supply of current to the heater elements 88 which are connected in appropriate parallel combination (e.g. of each two heater elements in series) to provide the desired energization.

In operation, the conveyor belt 16 is continuously driven and the heater elements are continuously energized. The food is loaded onto a conveyor at the loading end 12 and is carried through the tunnel enclosure 22 where it is cooked, and passes out to drop from the conveyor belt into the tray 74. Food drippings tend to be vaporized by the radiation within the tunnel enclosure 22, and vapors can escape through the open ends of the tunnel. The speed of the conveyor belt is adjusted by adjusting the speed of the motor drive; thereby the time of passage of the food between the upper and lower heater units 96 is preset in accordance with the time required for the cooking process. For example, in one practical form of the invention the open loading section of the conveyor belt in advance of the tunnel enclosure is about twelve inches in length and about the same in width, to provide an ample area for a substantial quantity of food; that is, an operator can load up the open loading section of the conveyor belt and leave it unattended to perform other duties, and return to fill it again as required. The tunnel enclosure is about two feet in length and the conveyor speed can be varied to pass food through the enclosure in anywhere from about one minute to four or five minutes. It has been found that foods such as raw hamburger can be cooked in about a minute and a half passage through the tunnel, while rolls and the like may require about three minutes to be baked from dough.

The short and long infrared radiation has the effect of penetrating the food and cooking it internally in the allotted time of passage. The ultraviolet radiation, it has been found, tends to sear or brown the outer surface of the food during its passage through the tunnel, so that when the cooked food is deposited in the tray 74, it has been cooked throughout and has been browned in a suitable fashion. Thus, internal and external cooking are performed at the same time and over the same period, so that in the single passage through the tunnel enclosure 22 the complete cooking process is performed. Sufficient radiation passes out of the tunnel enclosure 22 and strikes the food deposited in the tray 74 to keep it warm and ready for use. Various effects can be produced on the speed of the cooking process by changing the distances of the heater units 88, 96 above and below the belt 16. That is, the relative strengths of the different portions of radiation vary with the distance from the product on the belt. Thus, the infrared or ultraviolet contributions can be controlled by varying the distance of the heater units.

The location of the motor at the loading end of the housing has been found to be advantageous. The motor is kept cooler by being remote from the heating units, though it is located within the housing. The loading end of the housing is generally kept free of drippings and cooked food, since any food drippings are restricted to the tunnel enclosure and that which sticks to the conveyor belt is hardened upon its return passage through the tunnel enclosure. No special sealing of the motor unit is required as a result. Likewise, the drive sprockets 44 are kept relatively clear of grease and grime, with the drip pan 34 catching most of that which results from the cooking. Though the motor drive is at the loading end of the housing, the upper, material carrying surface of the belt is maintained horizontal due to the support of the edges of the belt by brackets 56, which run substantially the full length of the housing. The lower brackets 58 support the belt 16 during most of its return passage. The inside of the housing and the tunnel enclosure is readily accessible for cleaning when the conveyor belt 16 is removed in the manner described above; likewise, the belt itself may be cleaned when removed.

The tunnel enclosure does not require any substantial warm-up time since the cooking process employs essentially only radiation in the form of infrared and ultraviolet from the heater units. That is, the tunnel enclosure 22 is open at each end and does not have to be heated as in a hot-air oven. Moreover, the cooking process is substantially unaffected by the ambient temperature. The radiation is supplied continuously during operation, and a thermostat is not used to control the temperature or cooking process. The housing does not get hot and is maintained at a moderately warm temperature since any heating readily escapes to the surrounding air. In order to provide for rapid passage of the food through the tunnel enclosure, it has been found desirable to use 220 volts as the electrical supply. That is, a wattage of about 5,400 watts has been found to be required for the illustrated number of heater units that are used to permit rapid cooking. Where a slower passage of the food would be acceptable, 110-volt electrical supply could be used.

It will be apparent from the foregoing description that a new and improved radiant-heat conveyor cooker is provided by this invention. The equipment is suitable for rapid broiling and baking, is compact in size, efficient in use, and adapted for relatively easy cleaning. It will also be apparent that the above-described embodiment is only exemplary of the various features of this invention and that various modifications can be made within the scope of the invention as defined in the appended claims.

For example, it has been found that the bearings 62 and rod 60 therefor may be eliminated and the unloading end of brackets 56 used to provide the bearing and support of the conveyor belt 16 at the unloading end. Preferably, the unloading ends of the brackets 56 are slightly bent downward to provide a suitable guide for the conveyor belt as it passes outward and downward from the housing. The bearings 70 on the tension applying rod 68, it has been found, may be replaced by a Teflon-coated roller rotatably supported by the rod 68 and extending substantially the full width of the conveyor belt. Such a Teflon-coated roller functions as an idler bearing with a minimum of frictional interference with the movement of the conveyor belt. The lower brackets 58 serve to catch the conveyor belt when it is released and unlinked. Thereby the belt is readily accessible to the operator for removal. However, these brackets may be dispensed with if desired. The reflector 98 may be formed as an integral part of lid 24 and, if desired, the inner surface of the lid may be polished for use as a reflector. Under such circumstances, the lid is constructed so that the reflecting surface is positioned reasonably close to the upper heater tubes 96. For this purpose, it has been found that generally about one inch of spacing is optimum. Various distribution arrangements may be provided for the upper and the lower heater elements and sheaths 88, 96. Generally, a substantial number of individual radiation points or sources are required, these being distributed over the entire cooking area of the tunnel enclosure. For this purpose, the heater elements and sheaths 88, 96 can also be oriented to extend longitudinally along the path of the conveyor belt or along some intermediate angle thereto.

What is claimed is:

1. A radiant-heat conveyor cooker comprising:
   a housing including a pair of side walls, a material loading end, a tunnel enclosure portion, and an unloading end;
   an open-work continuous conveyor belt extending in its upper path as a material supporting surface between said housing walls from said loading end through said tunnel enclosure portion to said unloading end and returning in its lower path beneath said material supporting surface to said loading end;
   motor means between said housing walls at said loading end for driving and supporting the upper-path side of said belt, means at the unloading end of said housing for supporting said upper-path side and providing a bearing for the moving belt;

and a radiant-heat system including a plurality of heater-unit mountings located in said enclosure portion above and below the upper-path side of said belt;

said housing including means extending between the ends thereof for supporting the edges of said upper-path side of the belt;

said conveyor belt including a plurality of spaced bars extending transversely of the path of said belt with the ends thereof bent to extend substantially along said path, each end of a plurality of said bars being formed with a substantially closed link around the next adjacent bar, and one of said bars being formed with open links for removably engaging the next adjacent bar to complete the continuous belt;

and said belt supporting and bearing means including means for releasably applying tension to said belt to maintain said open-link bar in engagement, and rod means and bracket means mounted on said housing walls at said unloading end for removably supporting said rod means to engage the inside surface of said belt and to apply tension thereto, whereby upon removal of said rod, the open-link bar of said belt is disengageable for removal of said belt.

2. A radiant-heat conveyor cooker as recited in claim 1, wherein:

said belt supporting and bearing means includes a pair of bracket means attached to and projecting outwardly from the unloading ends of said housing walls, and bearing means for said belt extending between and supported by said bracket means, whereby the path of said conveyor belt projects outside of said housing walls and material carried by said belt is unloaded externally of said housing.

3. A radiant-heat conveyor cooker as recited in claim 2, wherein said housing includes means attached to and projecting outwardly from the unloading ends of said housing walls for supporting a material receiving tray beneath the unloading end of said belt.

4. A conveyor cooker comprising:

a housing including a material loading end, a tunnel enclosure portion, and an unloading end;

an open-work continuous conveyor belt extending as a material supporting surface is said housing from said loading end through said tunnel enclosure portion to said unloading end and returning in its lower path beneath said material supporting surface to said loading end, said conveyor belt including a plurality of spaced bars extending transversely of the path of said belt with the ends thereof bent to extend substantially along said path, each end of a plurality of said bars being formed with a substantially closed link around the next adjacent bar, and one of said bars being formed with open links for removably engaging the next adjacent bar to complete the continuous belt; a heat system located in said enclosure portion adjacent said belt;

means for driving said belt;

and means connected to said housing for providing a bearing for the moving belt, including means for releasably applying tension to said belt to extend the belt and to maintain said open-link bar in engagement.

5. A radiant-heat conveyor cooker as recited in claim 4 wherein:

said belt bearing means further includes rod means and bracket means mounted on said housing for removably supporting said rod means to engage the inside surface of said belt and to apply tension thereto, whereby upon removal of said rod, the open-link bar of said belt is disengageable for removal of said belt.

6. A radiant-heat conveyor cooker as recited in claim 5 wherein:

said bracket means includes a pair of brackets attached to and projecting outwardly from the unloading end of said housing enclosure, said belt bearing means extends between and is supported by said brackets, whereby the path of said conveyor belt projects outside of said housing enclosure and material carried by said belt is unloaded externally of said housing.

7. A radiant-heat conveyor cooker as recited in claim 6, wherein said housing includes means attached to and projecting outwardly from the unloading ends of said housing walls for supporting a material receiving tray beneath the unloading end of said belt.

References Cited

UNITED STATES PATENTS

| 1,536,538 | 5/1925 | Stouffer | 99—386 |
| 1,555,336 | 9/1925 | Vaughan | 99—386 XR |
| 1,656,709 | 1/1928 | Kelly. | |
| 1,662,847 | 3/1928 | Cook. | |
| 2,535,268 | 12/1950 | Coats | 338—268 XR |
| 2,633,228 | 3/1953 | Potts | 198—195 |
| 2,820,131 | 1/1958 | Kodama | 219—388 |
| 3,119,355 | 1/1964 | Gawlitza et al. | 219—388 XR |
| 3,249,741 | 5/1966 | Mills | 219—388 |

FOREIGN PATENTS 1,032,790   6/1966   Great Britain.

BILLY J. WILHITE, *Primary Examiner.*

U.S. Cl. X.R.

99—400, 401, 443, 444, 447, 450; 198—195; 219—388; 263—8